United States Patent [19]
Julesz

[11] 4,032,237
[45] June 28, 1977

[54] STEREOSCOPIC TECHNIQUE FOR DETECTING DEFECTS IN PERIODIC STRUCTURES

[75] Inventor: Bela Julesz, Warren, N.J.

[73] Assignee: Bell Telephone Laboratories, Incorporated, Murray Hill, N.J.

[22] Filed: Apr. 12, 1976

[21] Appl. No.: 675,779

[52] U.S. Cl. .............................. 356/237; 350/94; 350/130; 350/320; 351/3; 351/33; 356/244
[51] Int. Cl.$^2$ ........................................ G02B 27/22
[58] Field of Search ................ 350/35, 36, 92, 94, 350/130, 132, 145, 320; 351/3, 33; 356/237, 244

[56] References Cited

UNITED STATES PATENTS 2,674,156  4/1954  Mahler .............................. 350/132

OTHER PUBLICATIONS

Julesz, *Foundations of Cyclopean Perception*, University of Chicago Press, pp. 89–91, 186–201, 249, 285–288, 315, 1971.
Julesz, "Cooperative Phenomena in Binocular Depth Perception", *American Scientist*, vol. 62, No. 1, pp. 32–43, 1974.
Julesz, "Binocular Depth Perception of Computer Generated Patterns", *Bell System Tech. J.*, vol. 39, pp. 1125–1162, 1960.
Julesz, "Texture and Visual Perception", *Scientific American*, vol. 212, No. 2, pp. 38–48, 1965.

Primary Examiner—John K. Corbin
Assistant Examiner—Matthew W. Koren
Attorney, Agent, or Firm—Michael J. Urbano

[57] ABSTRACT

An aid-to-operator technique is described for the inspection of periodic structures such as LSI wafers or masks. A commercially available stereomicroscope in conjunction with a depth marker enables the operator to achieve the stereoscopic "wallpaper effect" with the periodic patterns on the structure. Depth markers are strong stimuli, such as random dot stereograms, which influence the operator's visual system to fuse periodic structures adjacent to them. The wallpaper effect is observed when a periodic pattern in the left field of view is fused with a horizontally shifted pattern in the right. Then it is possible to perceive depth at several depth planes. One of these corresponds to the fusion of patterns in the left eye's view with horizontally adjacent patterns in the right eye's view. If one or more such patterns (chips) on a wafer are defective, the deviation between the two fields of view will appear to flicker in and out of the plane of the fused image. Defects are observed as deviations between fused structures and the flicker attracts the operator's attention to the location of the defects. Sample holders are also described for the simultaneous presentation of the depth marker and the structure.

17 Claims, 4 Drawing Figures

STEREOSCOPIC TECHNIQUE FOR DETECTING DEFECTS IN PERIODIC STRUCTURES

BACKGROUND OF THE INVENTION

The invention is directed to a stereoscopic technique for inspection of periodic structures such as large scale integration (LSI) wafers or masks.

Wafer inspection, in particular, has been a problem since a wide variety of imperfections are tolerable. Color changes due to oxide thickness variation, slight pattern misalignment, and some pattern aberrations are acceptable. Presently, wafers are inspected by human operators who use binocular microscopes to examine the structures on the wafer one at a time and then judge whether a particular defect is critical or not. Such a procedure is time consuming, tedious, and highly subjective.

In an effort to facilitate wafer or mask inspection, some partially automated techniques have been developed. However, a fully or partially automated system for wafer inspection is both expensive and technically complex at this time. Mask inspection, in which less deviation is tolerable, is more amenable to partially automated techniques. One such technique is the Automated Mask Inspection System (AMIS) which is described by Sittig et al. in Proceedings of the Kodak Microelectronics Seminar, Oct. 29-30, 1973, p. 49-52. Adjacent patterns on a mask are compared by optically scanning the corresponding parts with a pair of laser beams and subtracting the resultant output to obtain an indication of differences. An adaptation of AMIS to wafer inspection is described by Cuthbert in copending application U.S. Ser. No. 473,233, filed on May 24, 1974, now U.S. Pat. No. 3,944,369, issued Mar. 16, 1976, and assigned to the assignee hereof, in which electronic gating is added to avoid the rejection of wafers having acceptable pattern aberrations. That is, two scanning light beams are intensity modulated by patterns on the reference and test samples. The modulated optical signals are coupled into electronic circuitry which gates preselected combinations of the signals in accordance with a number of predetermined threshold levels to produce an output indicative of differences between the reference and the test samples.

Another partially automated mask inspection technique utilizes spatial filtering as disclosed by Cuthbert in U.S. Pat. No. 3,790,287, assigned to the assignee hereof. Light beams scan the surface to be inspected and a reflected portion of the beam is spatially filtered so that only that portion scattered by defects is detected beyond the spatial filter.

The three partially automated systems described above all require relatively complicated mechanical, optical, and electrical apparatus. As sophistication is increased for better adaptation to wafer inspection, the equipment will likely become even more complex.

An approach to decreasing cost and complexity is to use aid-to-operator techniques. One common technique involves a blink comparator, a device for alternately viewing two nominally identical fields so that differences between the fields will appear to blink. However, presentation of the images in alternation still requires fairly complex optical devices and electrical circuits.

SUMMARY OF THE INVENTION

In accordance with one embodiment of this invention, a commercially available stereomicroscope is used in conjunction with a depth marker. The depth marker functions as a stimulus to aid the operator's visual system to fuse spatially nonidentical structures so that a deviation between them will flicker and call the operator's attention to the site of the defect.

The flicker is a result of the stereoscopic wallpaper effect, (Julesz, *Foundations of Cyclopean Perception*, University of Chicago Press, Chicago, 1971, page 186). When periodic patterns such as the structures on an LSI wafer are stereoscopically viewed, any pattern in the left field of view may be fused with a corresponding pattern in the right field of view. If, instead of the spatially identical pattern, fusion takes place with a horizontally shifted pattern, the image will appear to either hover above or sink beneath the image plane depending on the direction of the shaft. A mismatch (e.g., a defect on an LSI chip) between the two images will appear to flicker in and out of the plane of the fused image.

In a preferred embodiment, the stimuli are in the form of random dot stereograms (Julesz, *The Bell System Technical Journal*, 39 No. 5, 1960, pp. 1125–1162) which are computed to have a binocular disparity between left and right images equal to the periodicity of the structures. Since the depth at which an image is perceived is proportional to binocular disparity, adjacent structures will be fused when their image appears flush with the patterns in depth on the stereograms. Then, deviations between the structures are located by the presence of flickering.

Several illustrative sample holders are described to provide simultaneous presentation of the structure and at least one random dot stereogram within the field of view of the stereomicroscope. One of the holders is designed to allow the binocular disparity of the random dot stereograms to be adjusted to suit various periodicities.

DETAILED DESCRIPTION OF THE INVENTION

Figure 1:
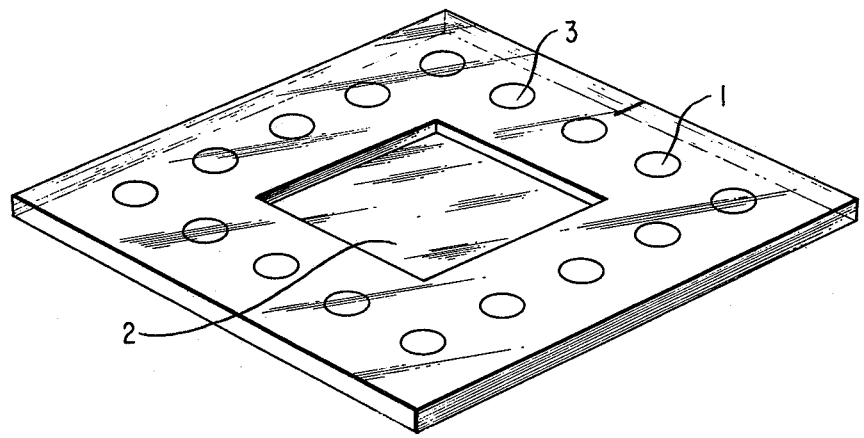
FIG. 1 shows an illustrative embodiment of a sample holder for use in the inventive technique.

The invention utilizes the ability of the binocular visual system to find corresponding points in both fields of view and fuse them into an image in depth. Binocular parallax (or disparity) is the horizontal shift between the two fields of vision which gives the object being viewed a three-dimensional effect. In particular, the invention capitalizes on the wallpaper effect. This effect is based on the fact that periodic patterns often give rise to ambiguous depth. When a pattern in the left field of view is not fused with the identical set of points in the right field of view, but with a horizontally shifted pattern, the image perceived will appear to either hover above or sink below the plane of the rest of the image depending on the direction of the shift. A mismatch between amy of the points in the two fields will appear to flicker.

In one application of the invention, LSI wafers or masks represent periodic patterns and mismatches occur from the presence of defects. The invention enables an inspection operator to stereoscopically fuse, not the same structure but adjacent structures, (i.e., to achieve the wallpaper effect) so that defects may be located by flickering.

Since low magnification is sufficient to detect the presence of flickering, the inventive technique facilitates inspection by allowing a large number of structures on the water to be examined at a time. Defects are effectively located since the probability of finding identical deviations (or mismatches) on adjacent or nearby structures is negligible. Superposition of adjacent structures for comparison is preferrable since this minimizes the severity of tolerable deviations which commonly occur across wafers. The lower sensitivity of the inventive technique to slight misalignments and gradual color changes, in comparison to other aid-to-operator techniques and to the partially automated techniques, is an advantage in wafer inspection. The effect is easy to watch and thus eases operator fatigue. And, no mechanical movement is required to achieve the effect. Once the defect is located, magnification may be increased to determine criticality of the defect without the necessity of readjusting the binocular parallax of the stereomicroscope to reachieve the wallpaper effect.

In general, a depth marker (*Foundations of Cyclopean Perception*, supra, p. 198) is used to aid an operator to fuse adjacent or nearby rows on a wafer. A depth marker is a strong unambiguous stimulus which will influence the perception of an ambiguous stimulus (e.g., an image which contains periodicities) to be perceived in the same depth plane as the unambiguous.

In one embodiment of the invention, random dot stereograms are used as the unambiguous stimulus to force the ambiguous stimulus, the periodic structures being inspected, to be perceived in the same depth plane as the image on the stereogram. The depth at which an object is perceived is proportional to the binocular disparity between the left and right images of the object. Since the random dot stereograms influence the perception of the structures, the binocular disparity between the left and right images on the stereograms is made equal to an integral multiple of the periodicity of the structures. When the images on the stereograms and the structures appear to be flush (i.e., appear in the same depth plane) an operator is assured that adjacent or nearby rows have been fused.

Random dot stereograms are computer generated patterns which contain no depth cues other than binocular disparity. B. Julesz in *Foundations of Cyclopean Perception*, supra, pp. 285-289, describes how to generate random dot stereograms and how to portray the output. Straightforward computer techniques can be used to modify the stereograms for particular purposes. Typically, there are left and right images which when viewed monocularly will appear as random dots, but when stereoscopically fused will have a geometric pattern emerge which will either hover over or sink below the plane of the rest of the fused image. Both left and right images contain a geometrically shaped region printed in the same random pattern. There is a uniform horizontal displacement of that region in the left image with respect to the right. The area surrounding the geometrically shaped region is printed in a different random pattern but is identical on both images. The images are usually superimposed and then optically filtered so that the left image only is directed to the left eye and the right image only is directed to the right eye. The depth, which the pattern appears to have when stereoptically fused, is proportional to the binocular disparity between the patterns. Whether the pattern appears in the nasal (out) or temporal (in) direction depends on the direction of the horizontal displacement.

Besides "dots" in the sense of circular points, stereograms can be printed as lines or letters (*Foundations of Cyclopean Perception*, supra, pp. 89-91). Stereograms may be presented in various formats. For the purposes of the invention, either anaglyph or vectograph format is preferable. Anaglyph format (*Foundations of Cyclopean Perception*, supra, p. 315) involves superposition of left and right images, each of which is printed in the complementary color of the other. The anaglyph is viewed through a pair of lenses of which one is the same color as the left image and the other is the same color as the right image. The lenses act as optical filters to separate the left and right images by blocking that image which is printed in the same color. The vectograph format is a polarizing version of the anaglyph (*Foundations of Cyclopean Perception*, supra, p. 249). The name Vectograph (Trademark of Polaroid Corporation) is used to denote a type of polarizing film used in three-dimensional photography. Generally, images of the stereograms are printed with zero percent and 100 percent polarized areas. Shading is possible by decreasing the amount of polarization. The images are optically filtered by a pair of polarized lenses. One lens has its polarization perpendicular to that of one image so that the polarized area of that image will appear black. Conversely, the other lens has its polarization perpendicular to that of the other image. Better separation of the images can be obtained with this format since the other image will have polarization parallel to the one lens and will therefore be transparent. To achieve this advantage, however, the images and the lenses should be carefully aligned so that the polarization is in the desired direction as described above.

A preferred technique for achieving the wallpaper effect is through the use of a sample holder which is constructed to simultaneously present a view of a plurality of random dot stereograms with a view of the wafer to be inspected. Such a holder is illustrated in FIG. 1.

A wafer to be inspected is placed in a recess 2 in the body 1 of the holder. Alternatively, clips could be provided to hold the wafer in place. Random dot stereograms 3 are mounted on the body of the holder in regions contiguous to the wafer. These stereograms are shown in more detail in FIG. 2A. The stereograms are mounted so that they are in the field of view with the wafer and oriented so that the computed horizontal binocular disparity between left and right images is parallel to the direction in which periodicity of the structure is measured.

Figure 2A:
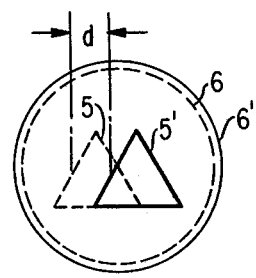
FIG. 2A and FIG. 2B show the relationship between binocular disparity, $d$, between the images of a random dot stereogram (FIG. 2A), and the periodicity, $D$, of structures to be inspected (FIG. 2B)
Figure 2B:
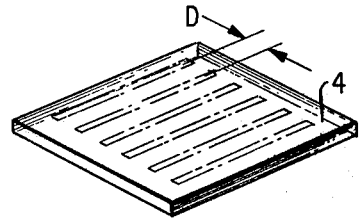

FIGS. 2A and 2B show the relationship between the binocular disparity, $d$, of the geometrically shaped regions 5 and 5' on the left and right images 6 and 6' of the stereogram (FIG. 2A) and the periodicity, $D$, of the structure 4 (FIG. 2B). The binocular disparity of the stereograms corresponds to some integral multiple, $n$, of the periodicity. If $n = 1$, then adjacent rows of the structure will be fused. If $n = 2$, then every other row will be fused, and so on.

The following is an illustrative technique. Miniaturized random dot stereograms in vectograph format are used on a sample holder such as that shown in FIG. 1. A wafer is mounted on the holder and the holder is placed under the stereomicroscope (not shown). A stereomicroscope, as is well known in the art, has a pair of optical viewing paths which act as extensions of the eyes to give the sample a three-dimensional effect. The stereomicroscope is focused on the wafer, but at least one stereogram is in the field of view. Optical filters are now used so that only one of the images of the stereograms appears in each path. Vectographs have left and right images comprised of dots polarized perpendicular to each other, so the optical filters are lens polarized perpendicular to the image which is to be conveyed in each path. Either the operator may wear polarized eye glasses or the stereomicroscope can be adapted so that appropriate lenses can be inserted when required. For effective separation the sample holder should be oriented so that the polarization of the images and the lens are parallel.

The wafer and the optically filtered stereograms are viewed simultaneously. The stereograms are strong stimuli and influence the operator's perceptual system to perceive the chips on the wafer at the same depth plane as the geometrically shaped image on the stereograms. When the chips appear flush with the stereoscopic patterns surrounding the wafer, the binocular disparity of the chips and stereograms is equal. Under these conditions, adjacent chips will be fused if the binocular disparity between the images of the stereograms has been chosen to be equal to the periodicity of the chips. The operator now scans the wafer for the presence of a flicker indicative of a defect. When a defect is found, resolution may be increased to characterize the defect with no additional adjustment of the binocular parallax of the stereomicroscope.

Figure 3:
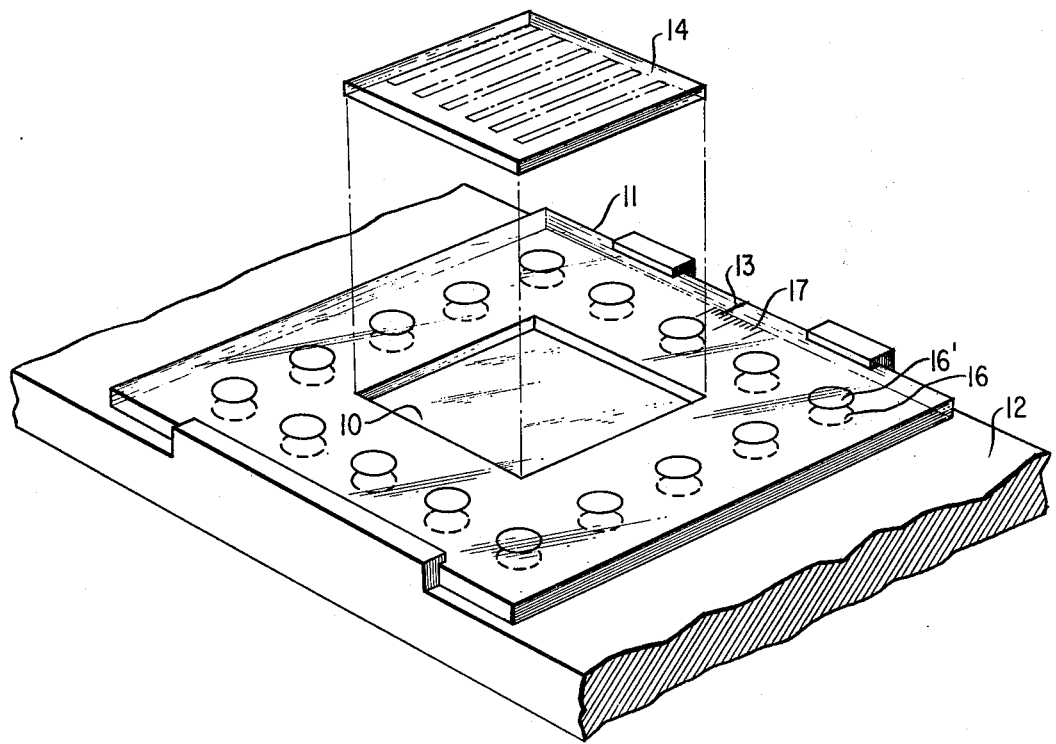
FIG. 3 shows another embodiment of a sample holder for use in the inventive technique.

An alternative sample holder which allows for inspection of various structures having different periodicities is shown in FIG. 3. This holder is constructed so the operator can adjust the binocular disparity between the images of the stereograms to suit the periodicity of the structures being examined. A transparent top 11 is made to slide on a base 12. The wafer is held in place by suitable means on the top 11. In this case, a recess 10 is formed into which the wafer 14 is inserted. The left image 16 in vectograph format, for example, of at least one random dot stereogram is mounted on the top major surface of base 12. The corresponding right image 16' is mounted on the top major surface of transparent top 11. Sufficient clearance should be provided between the top and the base to avoid abrasion of the stereograms. Both images are mounted so that they can be aligned by translation of the top. It is also advantageous to make the thickness of the transparent top 11 such that both images of the stereograms lie within the field of depth of the microscope. Gradations 17 on the top surface of base 14 serve as a measure of the binocular disparity between the images when aligned with a cross hair or line marker 13 on the top surface of top 11. Means not shown but well known in the art can be provided to lock top 11 in place once the binocular disparity has been adjusted.

The sample holders described and the techniques employing these holders are for the purposes of illustration only. Other variations are possible without departing from the spirit and scope of the invention.

What is claimed is:

1. A technique for inspecting a periodic structure for defects comprising the steps of:
   a. placing the structure and at least one random dot stereogram in the field of view of a stereomicroscope having a pair of optical viewing paths; the at least one stereogram having a binocular disparity between left and right images thereof which is an integral multiple of the periodicity of the structure;
   b. optically filtering each of the paths so that the left image of the at least one stereogram appears in one path and the right image appears in the other path;
   c. simultaneous with step (b) viewing the structure and the at least one stereogram together; and
   d. detecting the presence of flickering in the field of view of the stereomicroscope, said flickering being indicative of the presence and location of a defect.

2. The technique of claim 1 further comprising:
   e. after step (d), increasing resolution of the stereomicroscope to characterize the defect.

3. The technique of claim 1 wherein in step (a) the at least one random dot stereogram is in vectograph format in which the stereogram is formed by polarized dots, the left image having dots polarized perpendicular to those of the right image, and in step (c) each path is optically filtered by polarized lens means.

4. The technique of claim 1 wherein in step (a) the at least one random dot stereogram is in anaglyph format in which the left image is formed in the complementary color of the right image, and in step (c) each path is optically filtered by colored lens means.

5. A sample holder for use with a stereomicroscope in the inspection of a periodic structure which comprises:
   a. a base;
   b. means for removably mounting the structure on the base; and
   c. at least one random dot stereogram having left and right images mounted on a top major surface of the base within the field of view of the stereomicroscope and having a binocular disparity between left and right images thereof which is an integral multiple of the periodicity of the structure.

6. The sample holder of claim 5 wherein the at least one random dot stereogram is in vectograph format.

7. The sample holder of claim 5 wherein the at least one random dot stereogram is in anaglyph format.

8. A technique for inspecting a periodic structure for defects with the use of a stereomicroscope comprising the steps of:
   a. placing the structure on a sample holder which comprises a base, means for removably mounting the structure on the base, and at least one random dot stereogram having left and right images mounted on a top major surface of the base within the field of view of the stereomicroscope and having a binocular disparity between left and right images thereof which is an integral multiple of the periodicity of the structure;
   b. placing the sample holder with the structure attached under the stereomicroscope which has a pair of optical viewing paths;
   c. optically filtering each of the paths so that the left image of the at least one stereogram appears in one path and the right image appears in the other path;

d. simultaneous with step c) viewing the structure and the at least one stereogram together;
e. detecting the presence of flickering in the field of view of the stereomicroscope, said flickering being indicative of the presence and location of a defect; and
f. increasing resolution of the stereomicroscope to characterize the defect.

9. The technique of claim 8 wherein in step (a) the at least one random dot stereogram is in vectograph format in which the stereogram is formed by polarized dots, the left image having dots polarized perpendicular to those of the right image, and in step (c) each path is optically filtered by polarized lens means.

10. The technique of claim 8 wherein in step (a) the at least one random dot sterogram is in anaglyph format in which the left image is printed in the complementary color of the fight image, and in step (c) each path is optically filtered by colored lens means.

11. A sample holder for use with a stereomicroscope in the inspection of a periodic structure comprising:
a. a base;
b. a transparent top which slides on the base;
c. means for removably mounting the structure on the transparent top;
d. at least one random dot stereogram having a left image and a right image, one image being mounted on top major surface of the base and the other image being mounted on a parallel top major surface of the top in such a manner as to be superimposable upon translation of the top with respect to the base and to be within the field of view of the stereomicroscope; and
e. means to indicate the magnitude of translation required to create a binocular disparity between the left and right images so that the disparity can be adjusted to be an integral multiple of the periodicity of the structure.

12. The sample holder of claim 11 wherein said at least one random dot stereogram is in vectograph format.

13. The sample holder of claim 11 wherein said at least one random dot stereogram is in anaglyph format.

14. A technique for inspecting a periodic structure for defects with the use of a stereomicroscope comprising the steps of:
a. placing the structure on a sample holder which comprises a base, a transparent top which slides on the base, means for removeably mounting the structure on the transparent top, at least one random dot stereogram having a left image and a right image, one image being mounted on a top major surface of the base and the other image being mounted on a parallel top major surface of the top in such a manner as to be superimposable upon translation of the top with respect to the base and to be within the field of view of a stereomicroscope, and means to indicate the magnitude of translation required to create a binocular disparity between the left and right images so that the disparity can be adjusted to be an integral multiple of the periodicity of the structure;
b. placing the sample holder under the stereomicroscope which has a pair of optical viewing paths;
c. adjusting the binocular disparity between the images of the least one random dot stereogram to be an integral multiple of the periodicity of the structure;
d. optically filtering each of the paths so that the left image of the at least one stereogram appears in one path and the right image appears in the other;
e. simultaneous with step (d) viewing the structure and the at least one stereogram together;
f. detecting the presence of flickering in the field of view of the stereomicroscope, the flickering being indicative of the presence and location of a defect; and
g. increasing resolution of the stereomicroscope to characterize the defect.

15. The technique of claim 14 wherein in step (a) the at least one random dot stereogram is in vectograph format in which the stereogram is formed by polarized dots, the left image having dots polarized perpendicular to those of the right image, and in step (c) each path is optically filtered by polarized lens means.

16. The technique of claim 14 wherein in step (a) the at least one random dot stereogram is in anaglyph format in which the left image is formed in the complementary color of the right image and in step (c) each path is optically filtered by a colored lens means.

17. A sample holder for use with a stereomicroscope in the inspection of a periodic structure which comprises:
a. a base;
b. a transparent top slidably mounted on the base and having a recess in which the structure may be inserted;
c. a plurality of random dot stereograms in vectograph format each having left and right images, the left images being mounted on a top major surface of the base and the right images being mounted on a parallel top major surface of the top in such a manner as to be superimposable upon translation of the top with respect to the base and to be within the field of view of the stereomicroscope;
d. a line marker located on the transparent top; and
e. gradations on the base which, when aligned by translation of the top to be parallel with the line marker, indicate the magnitude of the binocular disparity between the left and right images of the random dot stereograms.

* * * * *